(12) United States Patent
Liu (10) Patent No.: US 7,494,183 B2
(45) Date of Patent: Feb. 24, 2009

(54) DUAL KEY HOLE ACTUATOR APPARATUS AND METHOD

(75) Inventor: Jintao Liu, Windsor (CA)

(73) Assignee: Schukra of North America, Lakeshore-Tecumseh (CA)

( * ) Notice: Subject to any disclaimer, the term of this patent is extended or adjusted under 35 U.S.C. 154(b) by 465 days.

(21) Appl. No.: 11/036,452

(22) Filed: Jan. 14, 2005

(65) Prior Publication Data

US 2006/0169091 A1    Aug. 3, 2006

(51) Int. Cl.
    *A47C 3/00* (2006.01)
    *F16C 1/12* (2006.01)
    *G05G 1/08* (2006.01)

(52) U.S. Cl. .................. 297/284.4; 74/501.6; 74/509; 29/428

(58) Field of Classification Search ............... 74/500.5, 74/501.6, 502.4, 502.6, 509; 297/284.1, 297/284.4; 29/428
See application file for complete search history.

(56) References Cited

U.S. PATENT DOCUMENTS

| | | | |
|---|---|---|---|
| 5,638,722 A | 6/1997 | Klingler | |
| 5,771,751 A | 6/1998 | Schwarzbich | |
| 6,053,064 A | 4/2000 | Gowing et al. | |
| 6,668,679 B2 | 12/2003 | McMillen | |
| 6,880,424 B2 * | 4/2005 | McMillen | 74/500.5 |
| 6,983,990 B2 | 1/2006 | McMillen | |
| 7,007,568 B2 * | 3/2006 | MacAulay et al. | 74/501.6 |
| 2003/0106970 A1 | 6/2003 | McMillen | |

* cited by examiner

*Primary Examiner*—Milton Nelson, Jr.
(74) *Attorney, Agent, or Firm*—Grant D. Kang; Kang Intellectual Property Law LLC (57) ABSTRACT

An actuator for a lumbar support device possessing a symmetrical housing in that key holes are present on both sides of such housing. The present invention's housing, with key hole slots diametrically opposed on one end, allows the actuator to be installed more easily in any orientation, in either driver or passenger side seats. With the dual key hole housing, the extra time and effort associated with ensuring that the correct side of the housing is being used is eliminated as the dual key holes allow the tension cable wire and tension cable wire end to be inserted into either side of the housing during assembly of the lumbar support system. The elimination of this concern will save valuable time and money in the actuator assembly process.

30 Claims, 6 Drawing Sheets

DUAL KEY HOLE ACTUATOR APPARATUS AND METHOD

BACKGROUND OF THE INVENTION

1. Field of the Invention

This invention relates generally to actuators and, more particularly, to actuators used in connection with a tension cable wire for use primarily in lumbar support systems for automobile car seats. The actuator disclosed here is designed to speed and streamline assembly of actuators with Bowden cables, lumbar supports, and seat frames.

2. Related Art

It is well known in the art to use an actuator in connection with a tension cable wire to provide movement in a lumbar support device located within a seat frame. Normally, the tension cable wire used in this type of configuration is a Bowden cable. A Bowden cable consists of a wire with wire ends on each side. The wire slides axially through a wire covering, sometimes referred to as a sleeve or conduit. In order to provide tension, the wire end is normally attached to a moving part while the wire covering is attached to a stationary unit. The moving part extends the wire end away from the wire covering end, thus creating a corresponding movement of the other wire end relative to the other sleeve end. The movement is used to actuate the lumbar support device. The movement is typically under tension.

It is also known in the art to use an actuator that employs the use of a threaded screw as the moving part that separates the tension cable wire end from the tension cable wire covering. Such an actuator generally contains a nut, which is also threaded, whereby as the nut is turned, the screw moves axially through the nut. One end of such screw normally has an aperture for the placement of a tension cable wire end. Somewhere near this aperture is also a stopper. The stopper prevents the tension cable wire covering end from extending with the tension cable wire end as the screw is directed away from the stopper. Such examples of these types of inventions are disclosed in U.S. Pat. No. 5,638,722 to Klinger, U.S. Pat. No. 6,053,064 to Gowing et al., and U.S. Pat. No. 5,771,751 to Schwarzbich.

Furthermore, a two screw system has also been previously disclosed whereby each screw contains oppositely threaded sections so that when the nut is rotated, the screws move simultaneously either closer or farther away from one another depending upon the direction the nut is rotated. See U.S. application Ser. No. 10/008,896 to Robert McMillen and PCT application PCT/US02/39076 to Robert McMillen. In this type of system, the stopper is generally contained on one screw while the aperture for receiving the wire end is contained on the other screw. Such a configuration allows for the same distance of movement between the tension wire cable end and the tension wire cable covering as in the single screw configuration; however, such a result is obtained with fewer turns of the nut. This advantage allows the car seat occupant to adjust the lumbar support system to the desired level of support while exerting a lesser amount of energy to accomplish the adjustment.

All of these inventions rely on some type of actuator to provide the movement necessary to produce the required tension at the opposite end of the tension wire cable needed to actuate the lumbar support device. Actuators are generally oriented in seat frames with a tab in the housing that is asymmetrical and designed to correspond with a slot in a seat frame hole provided for the actuator, or alternatively, a mounting grommet with a similar slot. Proper orientation is required for proper alignment with lumbar support components, Bowden cable routing, and consistency with left or right side seat assembly.

Many actuator housings employ the use of key hole apertures for mounting a tension cable wire end. The key holes are slots with a wide dimension designed to receive tension cable wire ends, and the bullet typically fixed to the wire end. A narrow neck of the key hole is designed to allow insertion of a tension cable wire while holding the end bullet against axial tension.

Previous actuators with single key holes in asymmetric housings cause improper installation and assembly confusion, when used as "snap-in" components. During the assembly process, workers must spend extra time and effort to ensure that the side of the housing that possesses the key hole is lined up properly with the wire end aperture such that the tension cable wire end can be properly inserted into the wire end aperture. This results in a relatively large amount of lost time in the assembly process and also leads to improper installation and confusion in the assembly of the actuators. There is a need in the art for an actuator design that will speed and streamline the assembly process and will eliminate the improper assembly and confusion associated with the asymmetric housings.

SUMMARY OF THE INVENTION

It is in view of the above problems that the present invention was developed. The invention is an actuator possessing a symmetrical housing in that key holes are present on both sides of such housing. The present invention's housing, with key hole slots diametrically opposed on both sides, allows the actuator to be installed more easily in any orientation, in either driver or passenger side seats. This is especially true in the screw type actuators described above. With the dual key hole housing, the extra time and effort associated with ensuring that the correct side of the housing is being used is eliminated as either side of the housing possesses the appropriate key hole. The elimination of this concern will save valuable time and money in the actuator assembly process.

There is also an advantage of this invention that relates to an improvement in the quality of the lumbar support device in which it is used. During operation, the lumbar support device can move from a point with the least amount of lumbar support to a point with the maximum amount of lumbar support. The position of least support is known as the rest position. Ideally, in the rest position, the lumbar support will put little or no tension on the traction cable wire, but will also be aligned with a fully retracted position of the actuator. This ideal assembly coordination among lumbar support, traction cable and actuator eliminates any "play" or slack in the linkage, and thereby promotes a sense of responsiveness and precision that can be felt by a user and is valued in the marketplace.

During the assembly process, access to the tension cable wire end receiver is blocked by the housing, unless the receiver is directly aligned with a key hole in the housing so that access to the receiver may be gained. As a result, the seat assembler may determine that the length of the tension cable wire end and its receiver do not match when the receiver is at the retracted position where the key holes align. Thus the matching wire length and receiver position to produce a resting assembly without slack or tension is not accessible at this length because there is no access to a key hole at this position. As such, the lead screw, which contains the receiver, must be rotated through the housing until the receiver aligns with the key hole. The more the lead screw is turned to accomplish this alignment, the greater the distance the receiver is moved from the ideal length, creating either unwanted tension or unwanted slack. Depending on the length calculated as being ideal, the lead screw of a single key hole actuator may have to be rotated as much as 180 degrees to achieve the proper alignment between the receiver and the key hole. However, the invention disclosed herein requires a maximum rotation of only 90 degrees to obtain the proper alignment of the receiver with one of the two key holes. Having dual key holes diametrically opposed on both sides of the actuator housing allows for proper alignment to be obtained with a smaller amount of rotation of the lead screw, which results in the receiver being closer to its ideal length when proper alignment is achieved.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Referring to the accompanying drawings in which like reference numbers indicate like elements, FIGS. 1-6 are perspective and side views of the actuator of the present invention. Housing 10 has two flanges 38 with holes for anchoring screws so that the unit may be mounted in an automotive car seat frame. Located within the housing 10 is a nut 26. The nut 26 can be rotated within the housing 10. The nut 26 contains a first sets of threads 40 and a second set of threads 28 on its inside diameter (See FIG. 4). The first set of threads 40 communicates directly with the upper lead screw 16 while the second set of threads 28 communicated directly with the lower lead screw 14. More specifically, the first set of threads 40 engages with the corresponding threads 30 of the upper lead screw 16 and the second set of threads 28 engages with the corresponding threads 34 of the lower lead screw 14.

Figure 1:
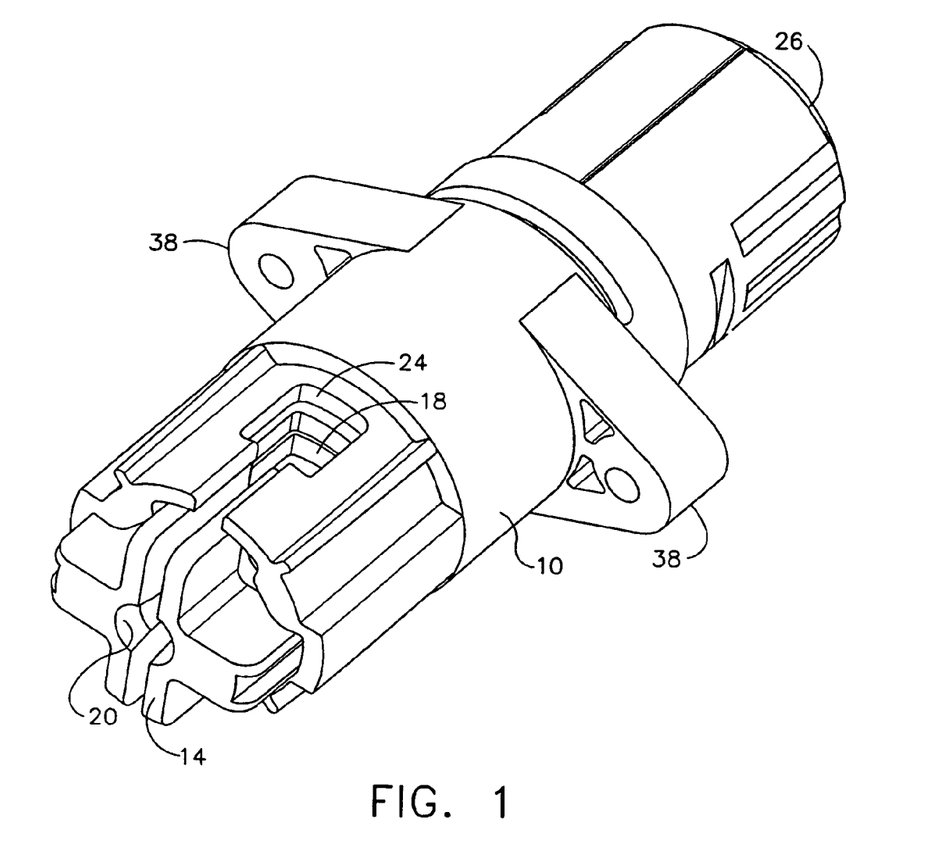
FIG. 1 is a perspective view of the assembled actuator.
Figure 2:
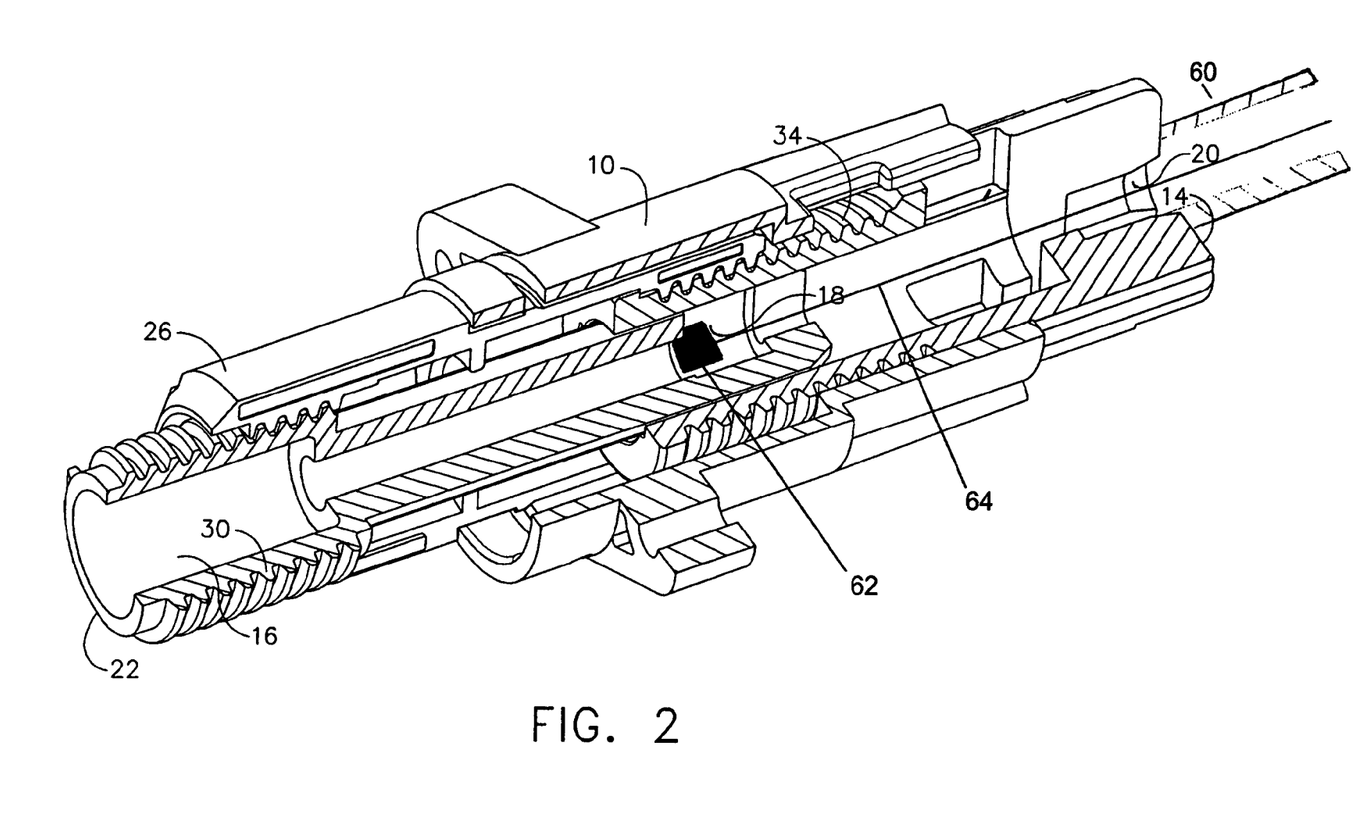
FIG. 2 is a cut away perspective view of the actuator in combination with a Bowden cable.

FIG. 2 is a cut away perspective view of the assembled actuator. The upper lead screw 16 contains a tension cable wire end receiver 18 for insertion of a tension cable wire end 62 for anchoring the wire. The lower lead screw 14 contains a tension cable sleeve stopper 20.

The upper lead screw 16 has threads 30 engaging the nut threads 40, which threads are in a first direction. Whether this direction is right or left handed is immaterial, provided that the upper lead screw is threaded in the opposite direction from the second set of nut threads 28 and the threads 34 of the lower lead screw 14. Thus configured, rotation of the nut 26 causes both lead screws 16 and 14 to extend relative to housing 10 and nut 26, in opposite directions.

Figure 3:
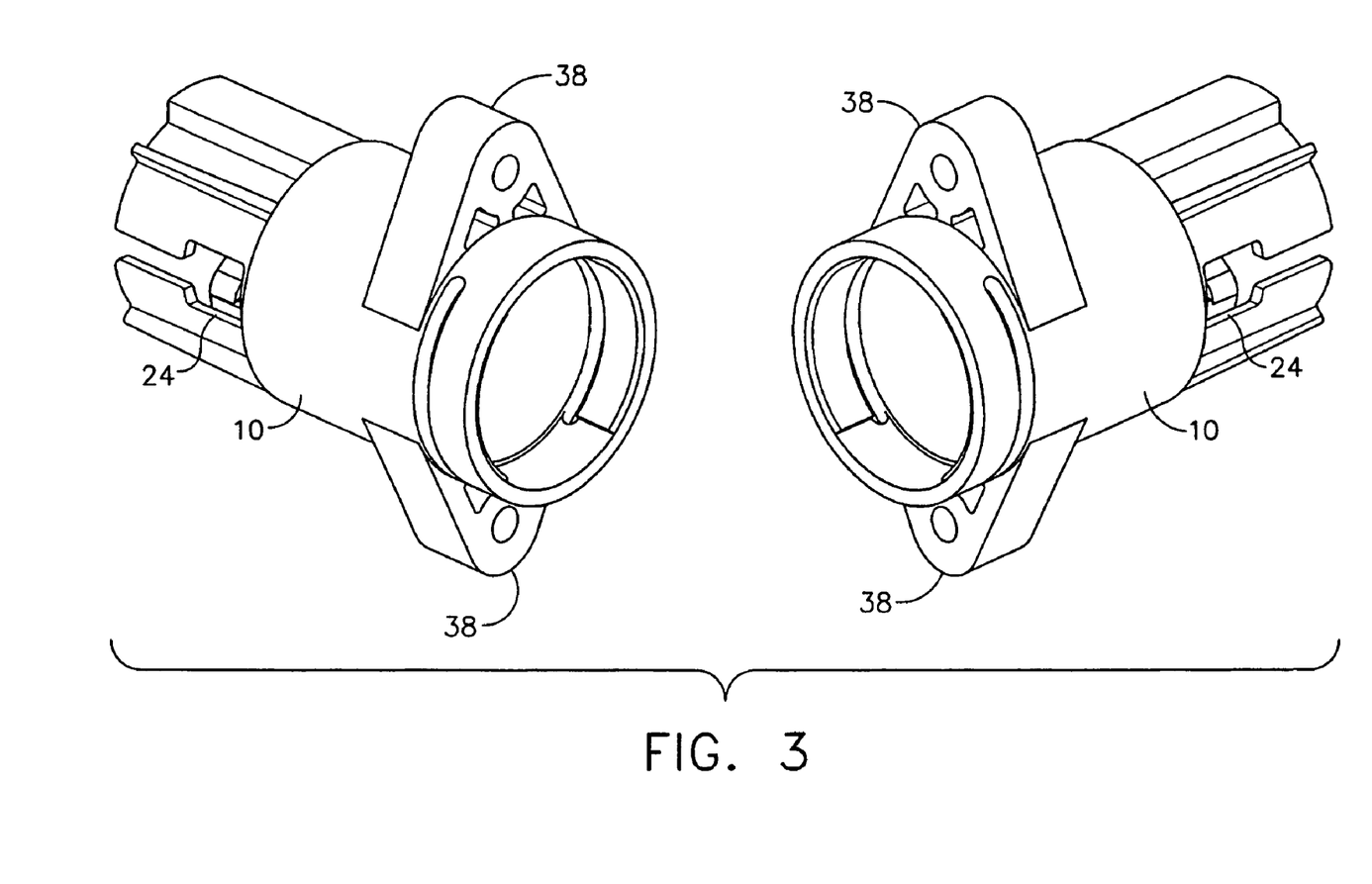
FIG. 3 are perspective views of the actuator housing.

FIG. 3 are two perspective views of the housing 10 of this actuator. The figures show the dual key holes 24 possessed by the housing 10. As seen in this figure, the key holes 24 are slots with a wide dimension designed to receive tension cable wire ends 62, and a narrow dimension designed to allow insertion of tension cable wires 64. In the depicted embodiment the two key holes 24 are located on the same end of the housing 10 and are diametrically opposed on both sides of the housing 10. Such a configuration allows the tension cable wire end 62 and tension cable wire 64 to be inserted into the tension cable wire end receiver 18 after the actuator has been completely assembled. Moreover, the dual key hole configuration eliminates the need for the assembly worker to determine which side of the housing has the key hole 24 during assembly. The tension cable wire end 62 and tension cable wire 64 may be properly inserted into either key hole 24 as the lumbar support system is being assembled. The housing 10 described in this embodiment is used in connection with a two screw actuator. However, other embodiments of this invention may possess the dual key hole housing in connection with a one screw type configuration as disclosed in some of the prior art discussed above.

Figure 4:
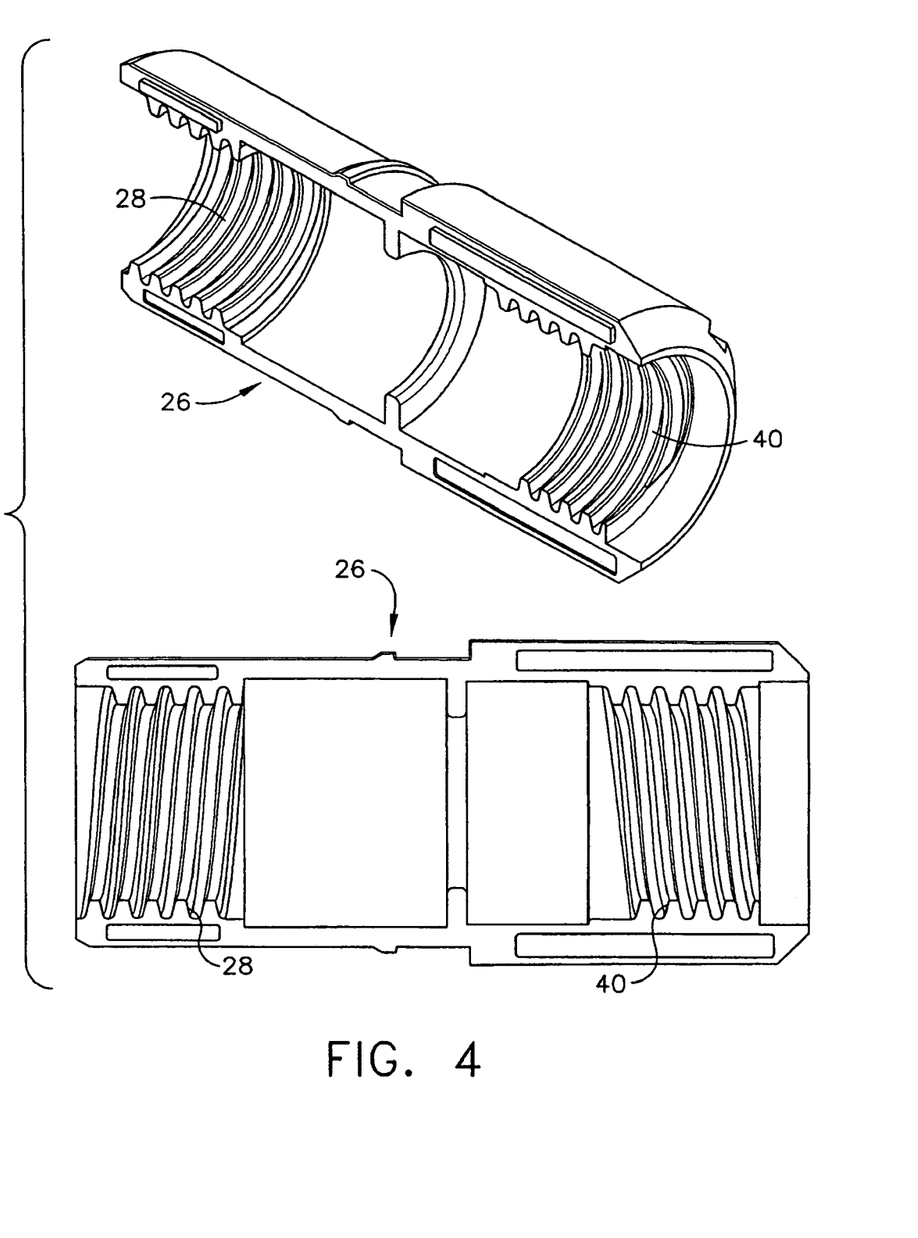
FIG. 4 is a cut away perspective and a cut away side view of the nut.
Figure 5:
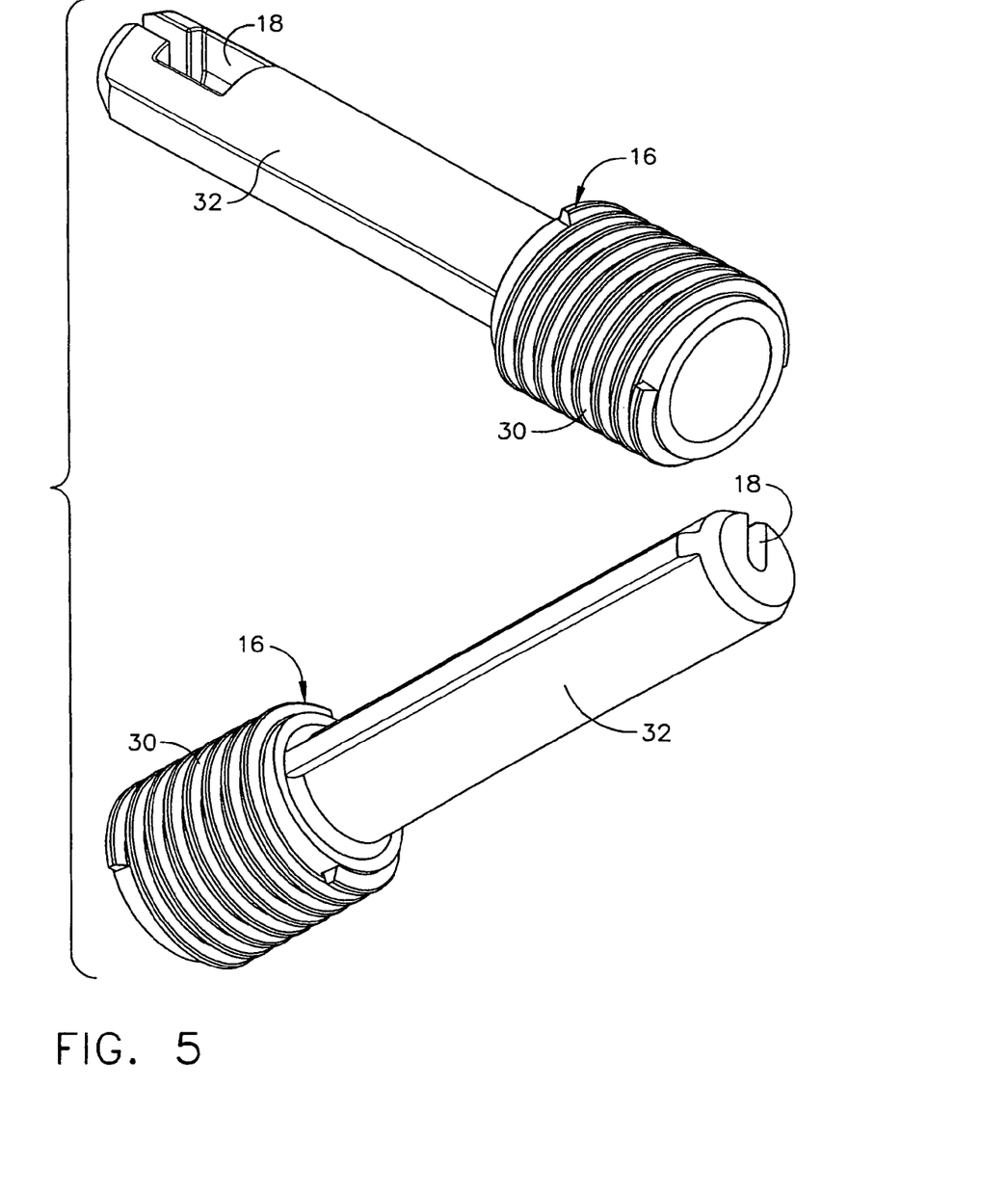
FIG. 5 are perspective views of the upper lead screw.
Figure 6:
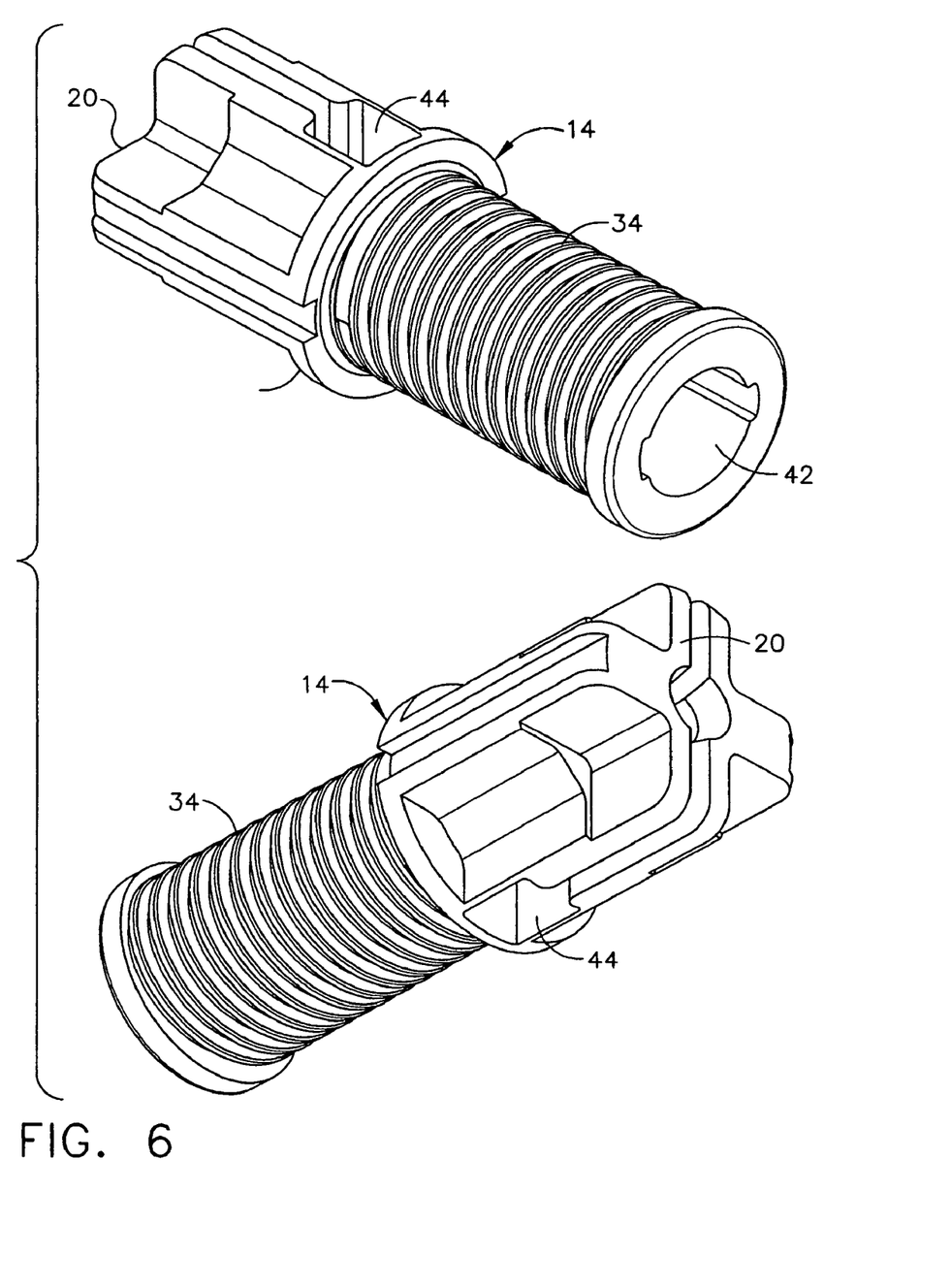
FIG. 6 are perspective views of the lower lead screw.

FIGS. 4-6 are detailed illustrations of the nut 26, the upper lead screw 16, and the lower lead screw 14. In order to achieve the tension required for movement of the lumbar support system, the nut 26, the upper lead screw 16, and the lower lead screw 14 are interconnected such that when the nut 26 is rotated in a certain direction, the upper lead screw 16 and the lower lead screw 14 are moved in an axial direction away from one another.

FIG. 5 is a perspective view of the upper lead screw 16. The upper lead screw 16 contains the tension cable wire end receiver 18 which is generally a type of aperture. The tension cable wire end 62 is attached to the upper lead screw 16 via the receiver 18. While attachment may occur in a variety of manners currently known in the art, the depicted embodiment is configured such that a wire end bullet will seat in the lead screw key hole simply by placing it there. The upper lead screw 16 also contains a set of screw threads 30. In this embodiment, the upper lead screw 16 possesses a shaft 32 that is inserted into the inner channel 42 of the lower lead screw 14. The shaft 32 extends the tension cable wire end receiver 18 a certain distance so that it is properly aligned with one of the key holes 44 of the lower lead screw 14.

FIG. 6 is a perspective view of the lower lead screw 14. From this figure, the inner channel 42 of the lower lead screw 14 is easily seen. This inner channel 42 allows the shaft of the upper lead screw 16 and the tension cable wire end receiver 18 to be located within the lower lead screw 14. Such configuration allows for reduction of the overall size of the actuator and reduces the space needed for its operation. The lower lead screw 14 also contains a tension cable sleeve stopper 20. The stopper 20 prevents the tension cable sleeve 60 from extending along with the tension cable wire end 62 as the wire end 62 is moved by the upper lead screw 16. The stopper 20 is preferably a counter sunk region at an end of the screw 14.

Other features of the lower lead screw 14 include the two key holes 44 located at one end of the lower lead screw 14 so that the tension cable wire end 62 may be inserted into the tension cable wire end receiver 18. In the depicted embodiment, the two key holes 44 are diametrically opposed on opposite sides of one end of the lower lead screw 14. As in the housing 10, the key holes 44 in the lower lead screw 14 allow for easier assembly of the lumbar support system as the tension cable wire end 62 and the tension cable wire 64 may be inserted into either key hole slot 44. This feature is important where the actuator is designed so that the tension cable wire end receiver 18 extends within the lower lead screw 14. With such a configuration, the tension cable wire 64 and the tension cable wire end 62 may not properly be inserted into the tension cable wire end receiver 18 as access to this area is blocked by the lower lead screw 14. The key holes 44 in the lower lead screw 14 allow an assembler access to the tension cable wire end receiver 18 so that insertion of the tension cable wire end 62 into the tension cable wire end receiver 18 may be completed.

As discussed earlier, the upper lead screw 16 and the lower lead screw 14 contain threaded portions 30 and 34. These threaded portions 30 and 34 communicate directly with the nut threads 40 and 28 located on the interior of the nut 26. When the nut 26 is rotated in one direction, the upper lead screw 16 and the lower lead screw 14 are moved apart from one another. When the nut 26 is rotated in the opposite direction, the upper lead screw 16 and the lower lead screw 14 are moved closer together. The outward movement of these two screws 14 and 16 results in the tension cable wire end 62 being separated from the tension cable sleeve 60, thus producing the desired tension at the opposite end of the tension cable wire to actuate the lumbar support system.

FIG. 4 also illustrates aspects of the invention that promotes ease of assembly. Nut 26 is split into two halves so that the upper lead screw 16 and lower lead screw 14 may be laid into their proper places in the threads on the inner aspect of nut 26. Once the lead screws 16 and 14 are placed in their proper positions, the second half of the nut 26 is placed over the lead screws. After this has been completed, the assembler can take this part of the actuator and "snap" it into the housing 10. Again, the advantage of the dual key hole housing 10 is seen at this point in the assembly process as the assembler is not required to take the time and effort to determine which side of the housing 10 has the key hole 24 and line it up with the tension cable wire end receiver 18. Instead, the assembler may merely place the nut, upper lead screw, and lower lead screw assembly into the housing 10 knowing that the tension wire end receiver 18 will properly align with at least one of the two key holes 24.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, even though this actuator is primarily intended to be used in conjunction with a lumbar support device in an automotive car seat, it can be used to provide tension in any type system employing the use of a tension wire cable. Similarly, although the dual key hole housing is used in connection with a two screw actuator in this embodiment, it can also be used with a single screw actuator or any other type actuator using an aperture for the placement of a tension cable wire end. Thus, the breadth and scope of the present invention should not be limited by any of the above-described exemplary embodiments, but should be defined only in accordance with the following claims appended hereto and their equivalents.

What is claimed is:

1. A tension cable actuator comprising:
   a housing having a first key hole and a second key hole;
   a tension cable sleeve stopper;
   a lead screw, said lead screw being threaded and said lead screw having a tension cable wire end receiver; and
   a nut located within said housing wherein said nut contains screw threads which communicate with said threads of said lead screw;
   whereby rotation of said nut within said housing causes said lead screw to move within said nut causing said tension cable wire end receiver to be separated from said tension cable sleeve stopper.

2. The actuator of claim 1, wherein said first key hole and said second key hole are diametrically opposed on one end of said housing.

3. A wire tension actuator comprising:
   a housing wherein said housing contains a first key hole and a second key hole;
   an upper lead screw having a first end and a second end, said first end being threaded in a first direction and said second end having a tension cable wire end receiver;
   a lower lead screw having a first end threaded in a second direction and a second end having a tension cable sleeve stopper; and
   a nut located within said housing, said nut having a first end threaded in a first direction and a second end threaded in a second direction, said nut threads being in operative communication with said threads of said upper lead screw and said lower lead screw;
   whereby rotation of said nut within said housing mediates axial travel of said upper and lower lead screws relative to each other.

4. The actuator of claim 3, wherein said first key hole and said second key hole are diametrically opposed on one end of said housing.

5. The actuator of claim 4, wherein one of said upper lead screw and said lower lead screw contains a first key hole and a second key hole.

6. The actuator of claim 5, wherein said first key hole and said second key hole of said one of said upper lead screw and said lower lead screw are diametrically opposed on one end of said lower lead screw.

7. The actuator of claim 5, wherein said receiver, one of said first and second key holes of said one of said upper lead screw and said lower lead screw, and one of said first and second key holes of said housing may align so that a tension cable wire end and a tension cable wire may be placed through said key holes and attached to said receiver.

8. The actuator of claim 3, wherein said housing, said nut, said upper lead screw, and said lower lead screw are made of plastic.

9. The actuator of claim 3, wherein said housing, said nut, said upper lead screw, and said lower lead screw are made of polyurethane.

10. The actuator of claim 3, wherein said housing, said nut, said upper lead screw, and said lower lead screw are made of metal.

11. The actuator of claim 3, wherein the actuator is adapted, to actuate a tension cable that is a Bowden cable.

12. The actuator of claim 3, wherein said upper lead screw has a shaft that inserts into said lower lead screw.

13. The actuator of claim 12, wherein said receiver is located at the end of said shaft.

14. The actuator of claim 3, wherein said lower lead screw is hollow.

15. The actuator of claim 3, wherein said nut is composed of two detachable pieces.

16. A wire tension actuator comprising:
   means for moving a cable end apart from a sleeve;

means for receiving said cable end;
means for stopping said sleeve; and
a housing enclosing at least one of said moving means, said receiving means, and said stopping means, wherein said housing contains a first key hole and a second key hole.

17. The actuator of claim 16, wherein said moving means comprises at least one of a nut and a first screw and a second screw; said stopping means comprises an end of at least one of said first screw and said second screw; and said receiving means comprises an aperture.

18. A lumbar support device for a seat comprising:
a support surface that translates between a first, non-supporting position and a second supporting position;
a guide that mediates the travel of said support surface between said first non-supporting position and said second supporting position;
a tension cable comprising a wire and a sleeve, said wire being disposed to slide axially through said sleeve, said wire having a first end and a second end and said sleeve having a first end and a second end and said first end of said wire and said first end of said sleeve being operatively engaged with said support surface and said guide;
an actuator housing adapted to mount on a seat frame, said housing having a first key hole and a second key hole;
an upper lead screw having a first end and a second end, said first end being threaded in a first direction and said second end having a tension cable wire end receiver;
a lower lead screw having a first end threaded in a second direction and a second end having a tension cable sleeve stopper; and
a nut located within said housing, said nut having a first end threaded in a first direction and a second end threaded in a second direction, said nut threads being in operative communication with said threads of said upper lead screw and said lower lead screw;
whereby rotation of said nut within said housing mediates axial travel of said upper and lower lead screws relative to each other.

19. The lumbar support device of claim 18, wherein said first key hole and said second key hole are diametrically opposed on one end of said housing.

20. The lumbar support device of claim 18, wherein said lower lead screw contains a first key hole and a second key hole that are diametrically opposed on one end of said lower lead screw.

21. The lumbar support device of claim 18, wherein said housing, said nut, said upper lead screw, and said lower lead screw are made of plastic.

22. The lumbar support device of claim 18, wherein said housing, said nut, said upper lead screw, and said lower lead screw are made of polyurethane.

23. The lumbar support device of claim 18, wherein the tension cable is a Bowden cable.

24. The lumbar support device of claim 18, wherein said upper lead screw has a shaft that inserts into said lower lead screw.

25. The lumbar support device of claim 18, wherein said lower lead screw is hollow.

26. A method of producing a tension cable actuator comprising:
fabricating an upper lead screw being threaded in a first direction, said upper lead screw having a tension cable wire end receiver for receiving a tension cable wire end;
fabricating a lower lead screw being threaded in a second direction and adapted to receive a tension cable wire covering;
engaging each of said lead screws in a nut, said nut having a first end threaded to engage said lower lead screw and having a second end threaded to engage said upper lead screw;
fabricating a housing having a first key hole and a second key hole for insertion of a tension cable wire and tension cable wire end; and
housing said nut such that turning said nut mediates travel of said lower lead screw and said upper lead screw.

27. The method of claim 26, comprising the further step of:
aligning said tension cable wire end receiver of said upper lead screw with one of said first key hole or said second key hole of said housing; and
inserting said tension cable wire and said tension cable wire end into said tension cable wire end receiver of said upper lead screw through said aligned key hole of said housing.

28. The method of claim 26, comprising the further step of:
fabricating said lower lead screw such that said lower lead screw also has a first key hole and a second key hole for insertion of a tension cable wire and tension cable wire end.

29. The method of claim 28, comprising the further step of:
aligning said tension cable wire end receiver of said upper lead screw with one of said first key hole or said second key hole of said lower lead screw and with one of said first key hole or said second key hole of said housing; and
inserting said tension cable wire and said tension cable wire end through said aligned key hole of said housing and said aligned key hole of said lower lead screw and into said tension cable wire end receiver of said upper lead screw.

30. The method of claim 26, comprising the further step of:
fabricating said housing whereby said first key hole and said second key hole are diametrically opposed on one end of said housing.

* * * * *